United States Patent
Ghere, Jr. et al.

(10) Patent No.: US 7,594,619 B2
(45) Date of Patent: Sep. 29, 2009

(54) COTTON FIBER PARTICULATE AND METHOD OF MANUFACTURE

(76) Inventors: A. Michael Ghere, Jr., 9024 S. 88th E. Place, Tulsa, OK (US) 74133; Homan B. Kinsley, 6161 E. River Rd., Bohannon, VA (US) 23021

( * ) Notice: Subject to any disclaimer, the term of this patent is extended or adjusted under 35 U.S.C. 154(b) by 20 days.

(21) Appl. No.: 11/492,213

(22) Filed: Jul. 24, 2006

(65) Prior Publication Data

US 2007/0062009 A1 Mar. 22, 2007

Related U.S. Application Data

(60) Provisional application No. 60/701,740, filed on Jul. 22, 2005.

(51) Int. Cl.
*B02C 19/00* (2006.01)
(52) U.S. Cl. .............................. 241/21; 241/23; 241/25
(58) Field of Classification Search .................... 241/25, 241/21, 23
See application file for complete search history.

(56) References Cited

U.S. PATENT DOCUMENTS

| | | | |
|---|---|---|---|
| 4,365,761 A | 12/1982 | Danforth | |
| 4,560,439 A | 12/1985 | Ranhagen | |
| 4,840,318 A | 6/1989 | Gustafsson | |
| 5,810,961 A * | 9/1998 | Andersen et al. ............ | 156/324 |

FOREIGN PATENT DOCUMENTS

| | | |
|---|---|---|
| EP | 1 036 7699 A1 | 9/2000 |
| EP | 1 048 690 A1 | 11/2000 |
| EP | 1 553 103 A1 | 7/2005 |

* cited by examiner

*Primary Examiner*—Mark Rosenbaum
(74) *Attorney, Agent, or Firm*—Fellers, Snider, Blankenship, Bailey & Tippens

(57) ABSTRACT

A cotton fiber particulate and method of manufacture including, generally, obtaining cotton fibers; mixing the cotton fibers with a solvent such as water to obtain a fiber furnish; milling the fiber furnish; and drying the fiber furnish to recover the cotton fiber particulate. Other steps include modifying the pH of the fiber furnish with a material such as calcium carbonate in an effort to make the fibers brittle, and filtering the fiber furnish to recover the cotton particulate. The fibers are milled to between 5-25 microns in length with a mean length of less than 50 microns with a mean length of 20 microns preferred.

15 Claims, No Drawings

COTTON FIBER PARTICULATE AND METHOD OF MANUFACTURE

CROSS REFERENCE TO RELATED APPLICATION

This application claims the benefit of copending U.S. Provisional Patent Application Ser. No. 60/701,740 entitled COTTON FIBER PARTICULATE AND METHOD OF MANUFACTURE filed Jul. 22, 2005.

FIELD OF THE INVENTION

This invention relates generally to cotton fibers and method of manufacture of short length cotton fibers.

BACKGROUND OF THE INVENTION

In the cosmetics industry, small particle size materials, such as talc, have been employed as a particulate material for many years. Such materials are preferably absorbent such that colorants, fragrances, and other related skin agents may be absorbed by or attached for application to the skin. However, it is known that such known particulates, and particularly talc, are lung and respiratory system irritants. A need, therefore, exists for a particulate material which is suitable for the cosmetics industry yet does not irritate the lungs or respiratory system.

As a result of the industrial manufacture of textile products from cotton such as apparel, carpet, furniture, and household goods, an enormous amount of scrap, clippings, imperfect (rejected) waste or scrap material is produced. It is estimated that only about half of this post-industrial (pre-consumer) scrap produced annually is recycled into usable by-products mainly for padding, stuffing, and insulating applications for the automotive, furniture, mattress, coarse yarn, home furnishings, paper, and other industries. In addition, particularly with regard to cotton apparel, and particularly denim fabrics, an enormous amount of post consumer cotton is produced annually. Such post consumer goods have very little commercial value. Due to the limited demand for this material for these uses, an enormous volume post-industrial and post consumer scrap is either burned or deposited in landfills annually. A need, therefore, exists for the method which employs fiber reclaimed from such post industrial and/or post consumer cotton scrap materials.

SUMMARY OF THE INVENTION

The present invention includes a cotton fiber particulate and a method of manufacture of a cotton fiber particulate. The cotton fiber particulate of the present invention includes a fiber length that preferably does not exceed approximately 50 microns and is preferably in the range of approximately 5-25 microns with a mean fiber length of approximately 20 microns being preferable.

A method of manufacture of the cotton fiber particulate of the present invention includes the general steps:
1. obtaining cotton fibers;
2. mixing the cotton fibers with water to obtain a fiber furnish;
3. milling the fiber furnish to a mean fiber length of approximately 20 microns;
4. filtering the fiber furnish to obtain the cotton fiber particulate of the present invention;
5. drying the filtered cotton fiber particulate.

In the above-described process, the fibers may be virgin cotton fibers, or they may be reclaimed fibers derived from cotton waste. In the event that reclaimed fibers are used, the fibers must first be opened and cut prior to use in the present process.

The fibers may also be refined via mechanical and/or chemical methods. Refining of the fibers provides for increased uniformity in fiber length and the ability to mill the fibers into shorter lengths in the resultant particulate. Refining also enhances the characteristic of the fibers in suppleness, absorbency, process ability, and purity.

In the alternative, the fibers may be cryogenically prepared in order to make the fibers very brittle. The fibers are then milled or otherwise fractured to the desired length.

The fibers may be milled using milling equipment known in the paper making industry for milling other types of cellulosic material such as wood pulp. Examples of these devices include a ball mill, rod mill, cylinder mill, or conical mill. However, it is understood that other types of milling equipment are contemplated.

The milled fiber furnish is filtered in a manner known in the paper making industry in the processing of wood and other cellulosic pulp. The resulting cotton fiber particulate is then dried. As a result of this process, a very small cellulosic (cotton fiber) particulate is produced which is useful for many varied consumer and industrial applications.

Examples of contemplated applications for the cotton fiber particulate include, but are not limited to the following:
a) use as a talc replacement;
b) chemical: increased reactivity for food additives as thickeners for food extenders;
c) time released delivery system for pharmaceuticals;
d) free radical scavenge;
e) filler for high opacity paper;
f) odor absorbent wall coverings for new and restoration construction;
g) flavor or fragrance release agent for cosmetics;
h) for use in incontinence products to reduce odors caused from bodily secretions;
i) water filtration;
j) carrier for insecticides or herbicide products due to its adhesive qualities;
k) non-addictive tobacco substitute;
l) add to cellulose acetate as a cigarette filter enhancement;
m) extender for adhesives to replace polyvinyl alcohol.

A better understanding of the present invention, its several aspects, and its advantages will become apparent to those skilled in the art from the following detailed description, wherein there is described the preferred embodiment of the invention, simply by way of illustration of the best mode contemplated for carrying out the invention.

DESCRIPTION OF THE PREFERRED EMBODIMENTS

Before explaining the present invention in detail, it is important to understand that the invention is not limited in its application to the details of the embodiments and steps described herein. The invention is capable of other embodiments and of being practiced or carried out in a variety of ways. It is to be understood that the phraseology and terminology employed herein is for the purpose of description and not of limitation.

The preferred embodiment of the present invention relates to a cellulosic (cotton fiber) particulate and the manufacture of a cotton fiber particulate from fibers recovered from post-industrial scrap. The scrap is comprised of waste or other such pre-consumer cotton products produced from the apparel, carpet, furniture, and household goods industries. Processes are available and known in the industry for cutting and opening the scrap raw material to produce component cotton fibers.

A process for cutting and opening fibers from the post-industrial waste stream has been developed by Sustainable Solutions, Inc. of Tulsa, Okla. Since the scrap is typically obtained from the producer/manufacturer, the component fibers of the textile scrap are known. The post-industrial scrap material may include synthetic, natural, and/or cellulosic fibers. In the case of certain cotton or denim scrap, other dye removal steps may be required.

The post-industrial scrap is first conveyed to scrap cutting station where the scrap material is cut into small pieces. From there, the cut scrap is conveyed to an opening line where a series of rotary cutters or rotary pins successively pull apart the fabric until it is reduced to its constituent fibers. The constituent fibers are then sorted. For the present process, cellulosic cotton fibers are isolated.

From the opening line, the opened fibers from the post-industrial scrap are conveyed to a baling apparatus. Once cut and opened, the reclaimed post-industrial scrap cotton fibers are baled for further processing.

By way of this process, opened and cut fibers can be obtained which are traceable to the originator of the post-industrial scrap as may be or become necessary as a result of legislation. When such traceable fibers are obtained, they are highly suited for use in the present process so that they can be traced through to the resultant composite web and thereon for further processing. In this way, the reclaimed fibers in the recycling stream are traceable to their origins.

If traceable fibers are obtained, those fibers can be tracked through the present process to the resultant composite web and products made therefrom. In this way, these fibers can be traced back to their source.

In the process of the present invention, opened and cut cellulosic cotton fibers from post-industrial scrap are first obtained. Constituent fibers having a length of approximately 4 mm are preferred. The opened and cut cellulosic component fibers are mixed with water to form a fiber furnish.

In order to obtain desired characteristics in the resultant particulate, it is advantageous to refine the fiber furnish prior to milling. With regard to the present invention, the term refining shall mean to perform a freeness reduction on the cellulosic fibers in the fiber furnish, to supply a dispersant, and to chemically modify the pH.

The refining process preferably includes a conventional technique for hydrating the cellulosic and natural fibers using a disk refiner equipped with bars in a water solution, however, other refining methods are contemplated in this process. Although hydration in the chemical sense does not occur, the affinity for water of the fiber matrix is enhanced. Refining the fiber causes the cellulosic component fibers to swell (take on water), bend, and fibrillate. The outer surfaces of the fibers become more slippery such that the tendency to form fiber flocs (bundles of fiber) is reduced. Refining greatly increases the wet specific surface of the fibers, the swollen specific volume, and the fiber flexibility. Refining also enhances the resultant particulate characteristics in the areas of suppleness, absorbency, process ability, and purity. A freeness reduction (Canadian standard) of the natural fibers from approximately 700° CSF down to approximately 200° CSF is preferred in the present process.

The pH of the cotton fiber furnish is then modified by the addition of a component such as calcium carbonate. The calcium carbonate ions having a crystalline structure are allowed to precipitate onto the component cotton fibers in the fiber furnish. The component cotton fibers thus become encased in crystallinic calcium carbonate ions. As a result, the encased component cotton fibers become brittle. It should be understood, however, that although calcium carbonate is preferred, other components could be substituted which are capable of encasing the cotton fibers and produce the desired brittleness.

The fiber furnish containing the refined and brittle cotton fibers are then processed through a hydro-form high-pressure conical mill in order to reduce the length of the fibers. The fact that the fibers are brittle assists in the breaking (fracturing) of the fiber lengths. The fibers are milled to a size of between approximately 5-25 microns in size with a preferred mean of approximately 20 microns.

Although the conical mill has been found to be particularly suitable for the preferred embodiment, it is understood that other milling devices such as a ball mill, rod mill, and cylindrical mill known for use in the paper making industry for the processing of wood pulp may also be suitable.

Once milled, the cotton fiber particulate is removed from the fiber furnish using filtering techniques known in the art. The filtered cotton particulate is then dried for further processing in consumer or industrial applications. As a result of the described process, a cotton fiber particulate is thus produced.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of manufacture of a cotton fiber particulate, comprising:
    obtaining cotton fibers;
    mixing said cotton fibers with water to obtain a fiber furnish;
    milling said fiber furnish to a mean fiber length of less than 50 microns;
    drying said fiber furnish to recover the cotton fiber particulate.

2. The method of claim 1 wherein said mean fiber length is approximately 20 microns.

3. The method of claim 1 wherein said fiber furnish is filtered to obtain the cotton fiber particulate.

4. The method of claim 1 wherein the pH of the fiber furnish is modified through the introduction of calcium carbonate.

5. The method of claim 1 wherein said cotton fibers are virgin cotton fibers.

6. The method of claim 1 wherein said cotton fibers are reclaimed fibers derived from cotton waste.

7. The method of claim 6 wherein said reclaimed fibers are opened and cut.

8. A method of manufacture of a cotton fiber particulate, comprising:
    obtaining cotton fibers;
    mixing said cotton fibers with a solvent to obtain a fiber furnish;
    milling said fiber furnish to a range of between approximately 5 and 25 microns;
    filtering said fiber furnish to obtain cotton fiber particulate;
    drying said cotton fiber particulate.

9. The method of claim 8 wherein said fiber furnish is milled to a mean of less than 25 microns.

10. The method of claim 9 wherein said fiber furnish is milled to a mean of approximately 20 microns.

11. The method of claim 8 wherein said solvent is water.

12. The method of claim 8 wherein the pH of the fiber furnish is modified with calcium carbonate.

13. The method of claim 8 wherein said cotton fibers are virgin cotton fibers.

14. The method of claim 8 wherein said cotton fibers are reclaimed fibers.

15. The method of claim 14 wherein said reclaimed fibers are opened and cut prior to mixing in a fiber furnish.

* * * * *